United States Patent [19]
Huyffer et al.

[11] 3,821,254

[45] June 28, 1974

[54] PROCESS FOR THE PREPARATION OF 3-(3'-LOWER CARBOALKOXY-4'-HYDROXY-1'-NAPHTHYL)-3-(3''-CARBOXY-4''HYDROXY-1''-NAPHTHYL)NAPHTHALIDE

[75] Inventors: Paul S. Huyffer, West Boxford; John J. Wasatonic, Cambridge, both of Mass.

[73] Assignee: Polaroid Corporation, Cambridge, Mass.

[22] Filed: Dec. 11, 1972

[21] Appl. No.: 314,096

[52] U.S. Cl. .................................. 260/343.2 R
[51] Int. Cl. .................................... C07d 7/10
[58] Field of Search ....................... 260/343.2 R Primary Examiner—Henry R. Jiles
Assistant Examiner—Mildred A. M. Crowder

[57] ABSTRACT

Carboxy-substituted 1-naphthol naphthalide indicator dyes are prepared by a base-catalyzed reaction of a 2-carboxy-1-naphthol and a 3-Z-3-(3'-lower carboalkoxy-4'-hydroxy-1'-naphthyl)naphthalide wherein Z is a leaving group to form the dye precursor which is then hydrolyzed to yield the corresponding indicator dye product.

9 Claims, No Drawings

PROCESS FOR THE PREPARATION OF 3-(3'-LOWER CARBOALKOXY-4'-HYDROXY-1'-NAPHTHYL)-3-(3''-CARBOXY-4''HYDROXY-1''-NAPHTHYL)-NAPHTHALIDE

BACKGROUND OF THE INVENTION

1. Field of the Invention

This invention relates to a method of preparing naphthalide indicator dyes, and in particular, it relates to the synthesis of certain 1-naphthol naphthalides useful as reagents in photography.

2. Description of the Prior Art

Copending U.S. Patent application Ser. No. 103,865 of Myron S. Simon filed Jan. 4, 1971 discloses and claims certain indicator dyes derived from 1-naphthols which find particular utility as optical filter agents in photographic processes for protecting an exposed photosensitive material from post-exposure fogging during development in the presence of incident light. Specifically, the 1-naphthol indicator dyes disclosed therein comprise 3,3-disubstituted phthalides and naphthalides wherein the 3,3 substituents are 4'-hydroxy-1'-naphthyl radicals at least one and preferably both of which possess a hydrogen-bonding group, such as, a carboxy, hydroxy, sulfonamido or sulfamoyl group substituted on a carbon atom adjacent to the 4'-hydroxy group. Among such dyes are phthalides and naphthalides wherein one or both of the 4'-hydroxy-1'-naphthyl radicals are substituted with a carboxy group in the 3'-position and which additionally may be substituted with an immobilizing group to render the dye substantially non-diffusible in a given photographic processing composition.

Various methods have been employed in the synthesis of the aforementioned indicator dyes including the carboxy-substituted 1-naphthol dyes. For example, carboxy-substituted 1-naphthol naphthalides have been synthesized by reacting (a) a 2-carboxy-1-naphthol and (b) a naphthalide intermediate, such as, a 3-halo- or a 3-hydroxy-3-(3'-carboalkoxy-4'-hydroxy-1'-naphthyl)-naphthalide or a diester of the 3-hydroxy naphthalide to form the dye precursor followed by hydrolysis to yield the indicator dye product. Depending upon the particular naphthalide intermediate, these prior methods have employed an acid, such as, a Lewis acid or a heavy metal salt, such as, silver tetrafluoroborate to catalyze the reaction of the 1-naphthol and intermediate, or the reaction has been conducted in the absence of a catalyst.

The present invention is concerned with another method of synthesizing the aforementioned carboxy-naphthol naphthalide dyes which comprises a base-catalyzed reaction to yield the dye precursor.

SUMMARY OF THE INVENTION

It is, therefore, the primary object of the present invention to provide a method of synthesizing 1-naphthol naphthalide indicator dyes.

Other objects of this invention will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claim.

According to the present invention, carboxy-substituted 1-naphthol naphthalides are synthesized by condensing (a) a 2-carboxy-1-naphthol and (b) an intermediate, 3-Z-3-(3'lower carboalkoxy-4'-hydroxy-1'-naphthyl)naphthalide wherein Z is a leaving group, in the presence of a catalytic amount of base to yield the corresponding dye precursor. The lower carboalkoxy group of the dye precursor is then converted to a carboxy group to yield the corresponding dye product.

For a fuller understanding of the nature and objects of the invention, reference should be had to the following detailed description.

DESCRIPTION OF THE PREFERRED EMBODIMENTS

It has been found quite unexpectedly that bases having a pKa of not less than about 2 which are non-water producing in the reaction of a 1-naphthol and a naphthalide intermediate may be used to catalyze the condensation of 2-carboxy-1-naphthol and a dye intermediate, 3-Z-3(3'-lower carboalkoxy-4'-hydroxy-1'-naphthyl)naphthalide wherein Z is a leaving group, for example,

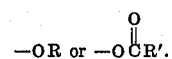

Specifically, the method of preparing carboxy-substituted 1-naphthol naphthalides according to the present invention comprises:

A. reacting (a) a 3-Z-3(3'-lower carboalkoxy-4'-hydroxy-1'-naphthly)naphthalide wherein Z is a leaving group and (b) a 2-carboxy-1-naphthol, unsubstituted or substituted with an aliphatic group in a molar ratio of about 1.0-1.5:1 in inert organic solution at a temperature not exceeding about 85°C. in the presence of a catalytic amount of a non-water producing base having a pKa of not less than about 2 to form the corresponding 3-(3'-lower carboalkoxy-4-'-hydroxy-1'-naphthyl)-3-(3''-carboxy-4''-hydroxy-1''-naphthyl)-naphthalide dye precursor and B. hydrolyzing said dye precursor to form the corresponding 3-(3'-carboxy-4'-hydroxy-1'-naphthyl)-3-(3''-carboxy-4''-hydroxy-1'''-naphthyl)naphthalide dye product.

The method of the present invention is shown in the following reaction sequence as illustrated by a monoether intermediate wherein Z is -OR:

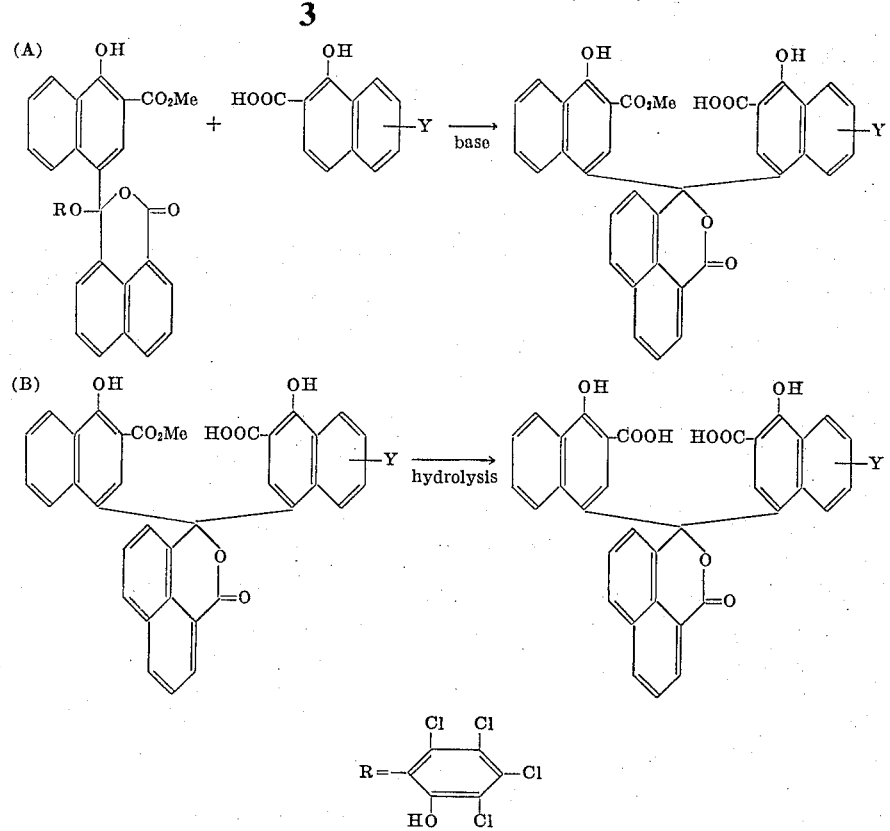

Though the method of the present invention may be used in the synthesis of 1-naphthol naphthalides, in general, it finds particular utility in the synthesis of indicator dyes as represented by the formula:

(I)
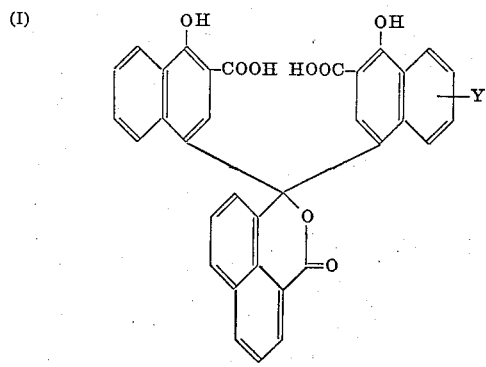

wherein Y is hydrogen or an aliphatic group usually containing up to about 20 carbon atoms.

The aliphatic group, branched or straight chain, may be alkyl, such as methyl, ethyl, isopropyl, butyl, t-butyl, hexyl, dodecyl, octadecyl or eicosanyl; alkenyl, such as, 3-butenyl, 2-methyl-1,3-butadienyl, 2-hexenyl and 9-octadecenyl; alkoxy, such as, ethoxy, butoxy, 1-ethoxy-2-($\beta$-ethoxyethoxy), hexyloxy, dodecyloxy, and octadecyloxy; and alkoxyalkyl, such as, methoxyethyl, methoxyethoxyethyl, butoxydodecyl and ethoxyethoxyhexadecyl. Also, the aliphatic group may be substituted with a solubilizing group, i.e., the alkyl, alkenyl, alkoxy and alkoxyalkyl groups enumerated above may be substituted with a solubilizing group, e.g., -OH, -COOH and -SO$_3$H.

Specific examples of 1-naphthol indicator dyes that may be prepared according to the method of the present invention are as follows:

(1)
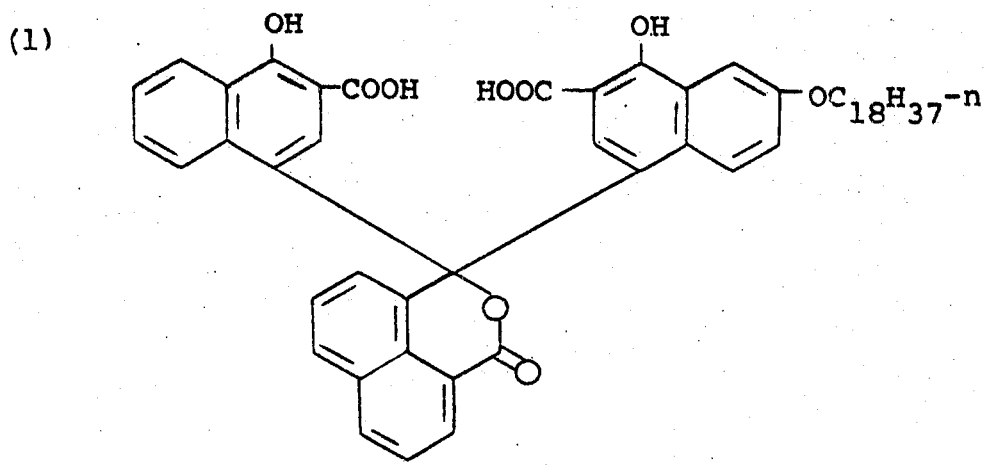

(2) 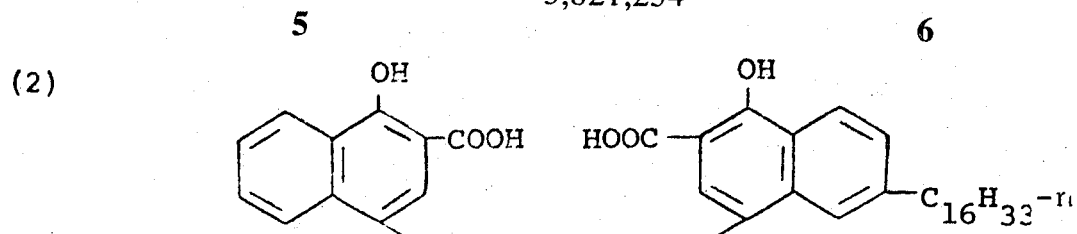
(3) 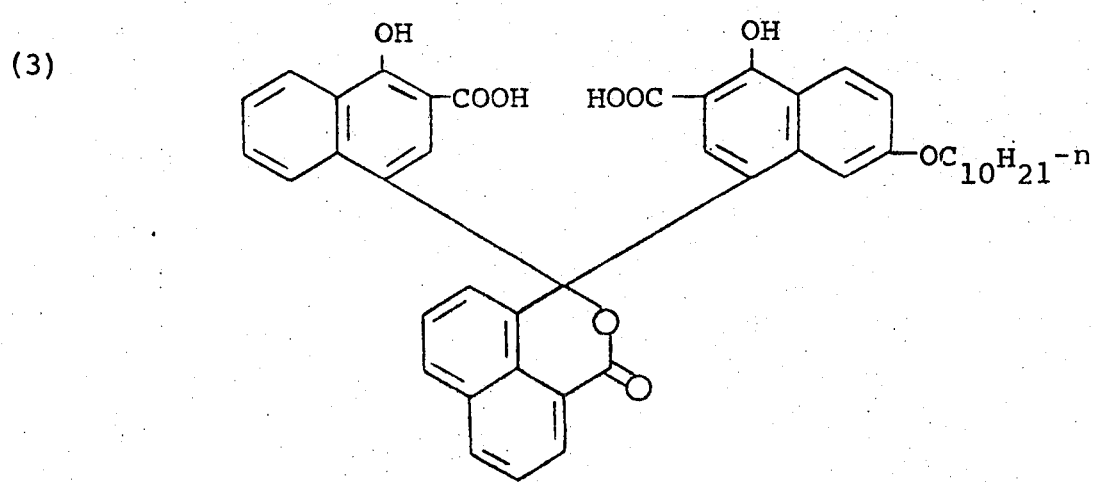
(4) 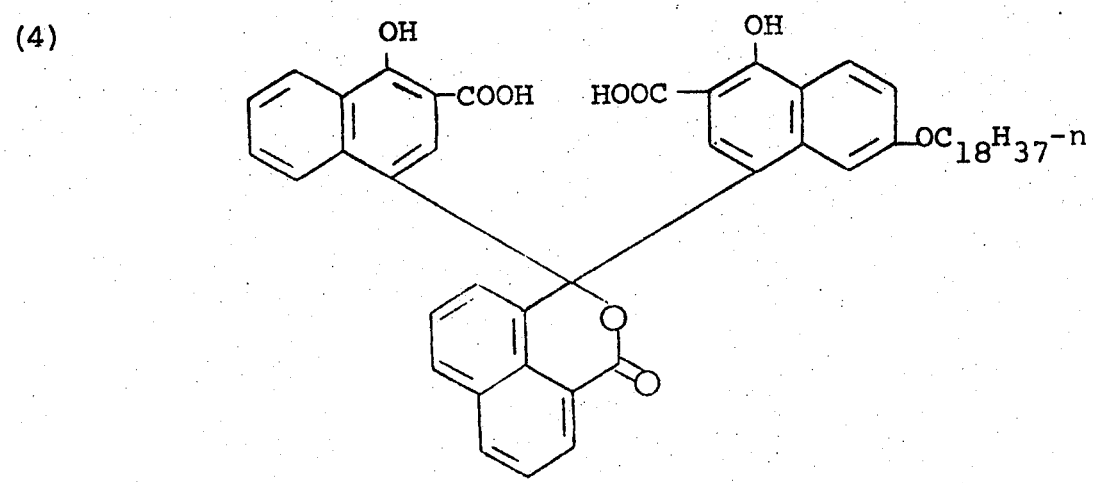

(5)
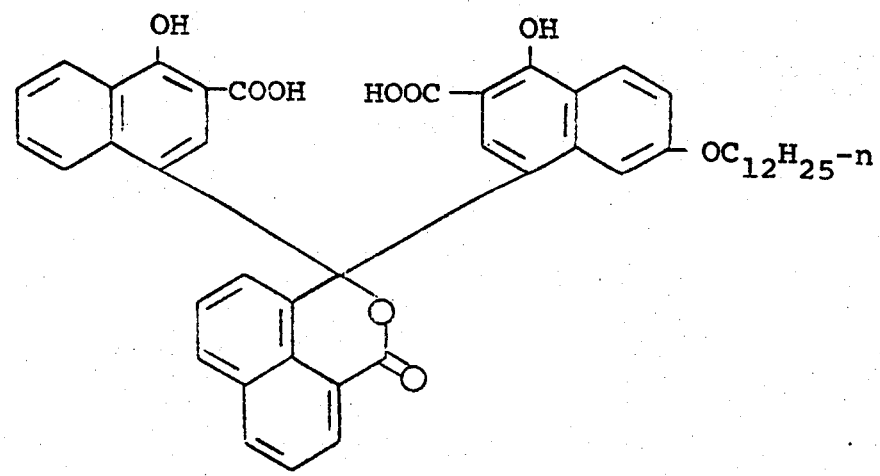
(6)
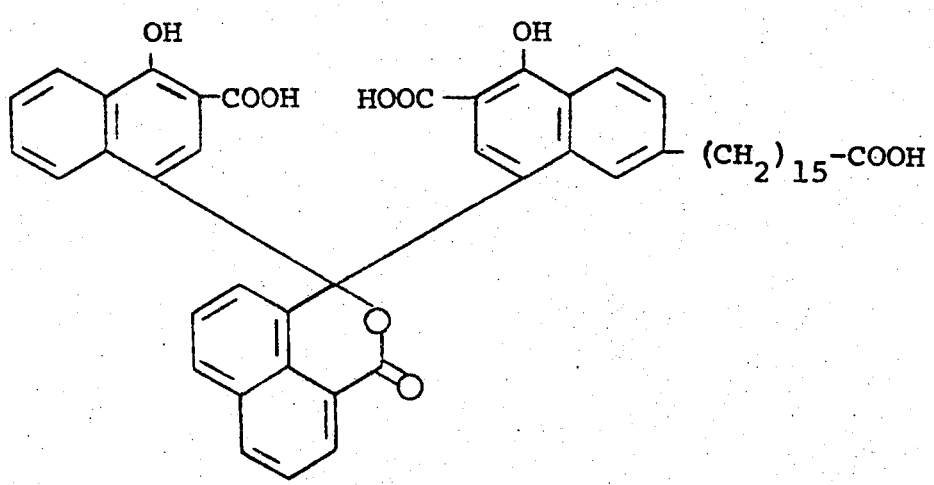
(7)
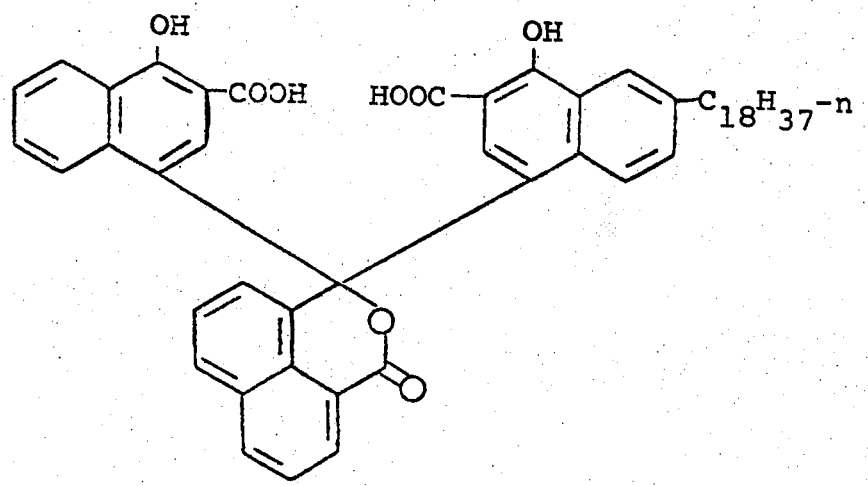

(8) 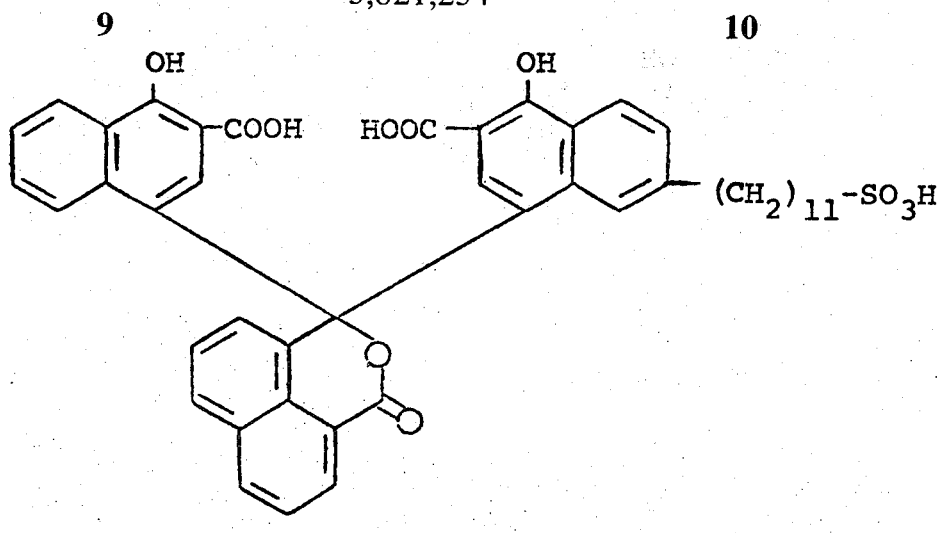
(9) 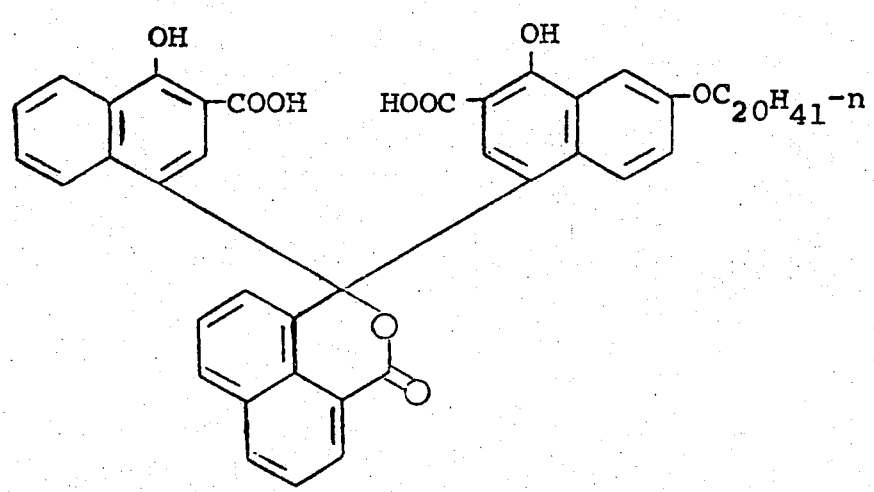
(10) 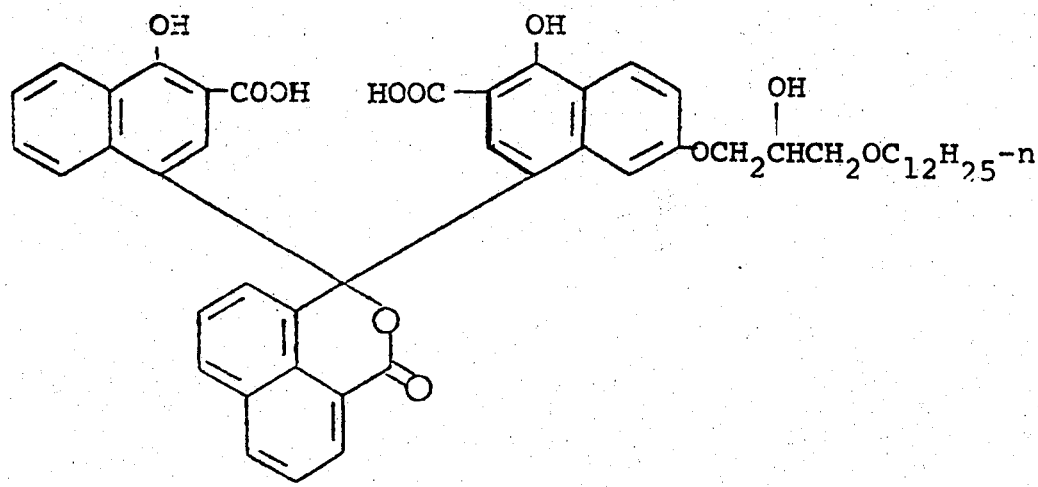

(11) 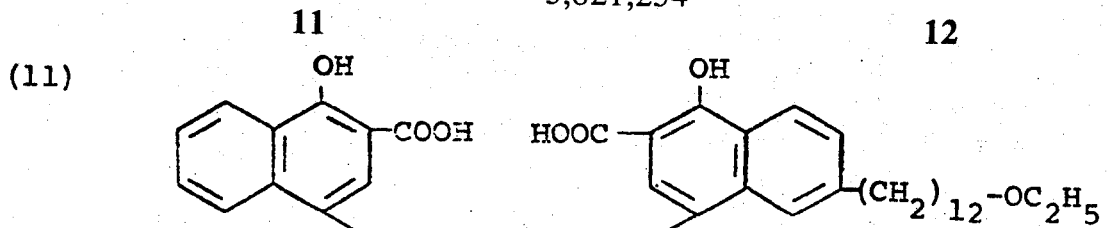
(12) 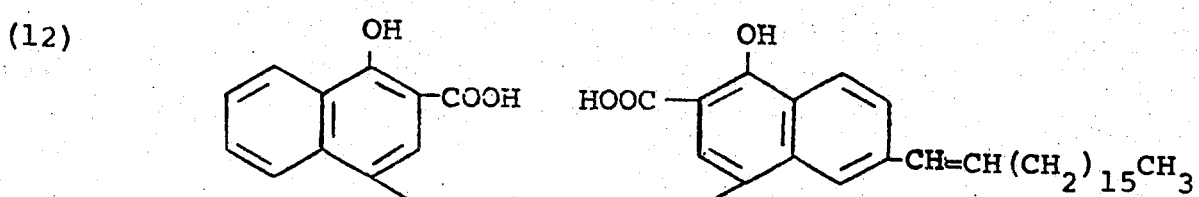
(13) 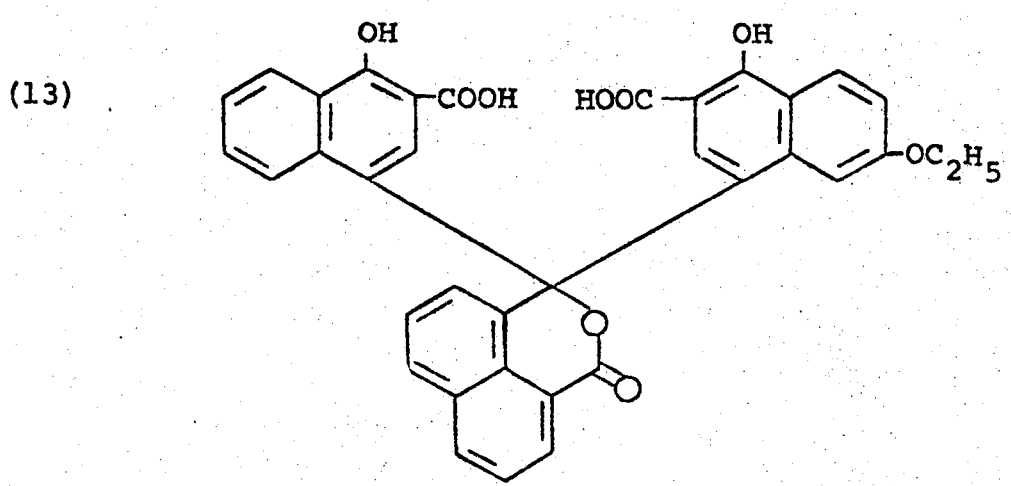

(14)
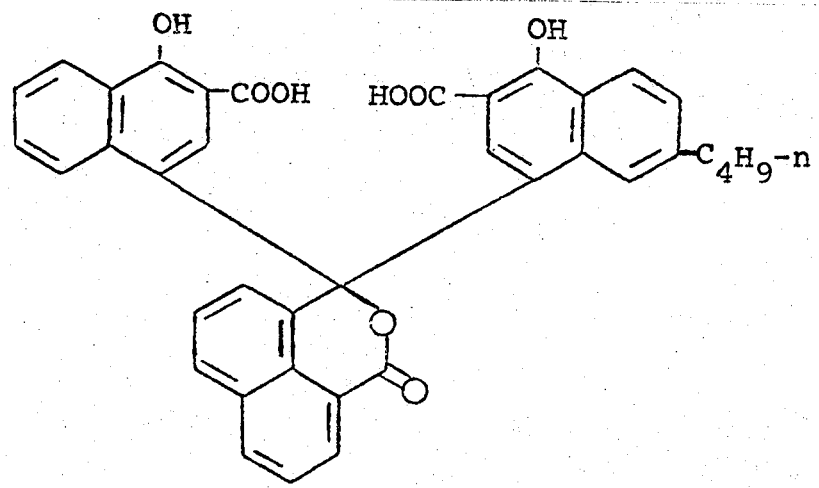
(15)
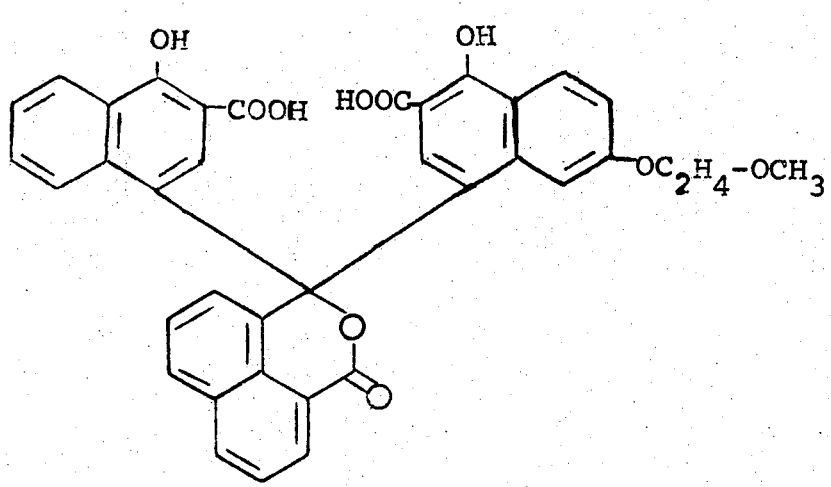
(16)
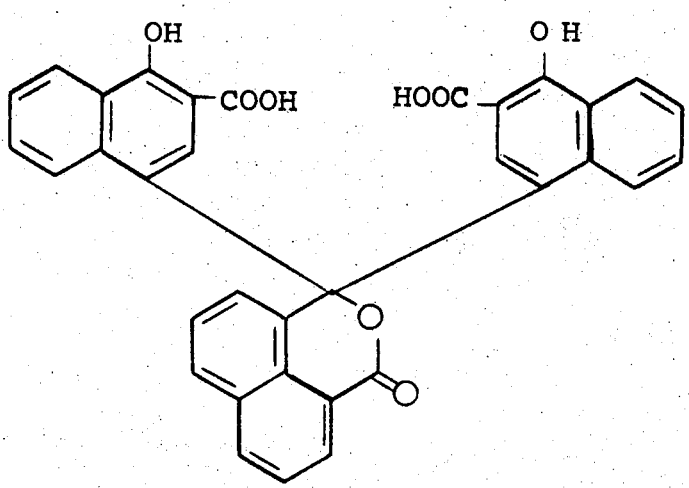

In carrying out the method of the present invention, the 3-Z-3-(3'-lower carboalkoxy-4-'-hydroxy-1'-naphthyl)naphthalide intermediate and the 2-carboxy-1-naphthol may be reacted in a molar ratio of about 1.0 to 1.5 moles of intermediate per mole of naphthol. To ensure high conversions while maintaining purity at relatively high levels, the intermediate is used in slight excess, and preferably, the intermediate and 1-naphthol are reacted in a molar ratio of about 1.1 to 1.2:1. The base selected to catalyze the reaction may be used in amounts ranging between about 0.01 and 2.0, but preferentially between about 0.05 and 0.15 mole per 1.0 mole of 2-carboxy-1-naphthol.

Useful as the catalyst are all bases strong enough to form salts with the naphthol carboxylic acid, i.e., 2-carboxy-1-naphthol present in the reaction including weaker bases having a pKa down to but not less than about 2, all of which are capable of forming salts with the naphthol carboxylic acid to some extent. Also, because the intermediates tend to be sensitive to moisture, the base selected to catalyze the reaction should not produce or release water during the reaction. Other than inorganic oxides and hydroxides and other bases that would form water, any base having a pKa of not less than about 2, including both organic and inorganic materials may be employed. Illustrative bases that may be used as the catalyst include inorganic bases, such as, lithium, sodium and potassium hydrides or amides, and organic bases, for example, primary, secondary and tertiary aliphatic amines, such as, n-decylamine, di-n-butylamine, triethylamine, n-butylamine, diisopropylamine, piperazines, piperidines, morpholines and aromatic amines, such as, aniline, 4-bromoaniline, N,N-diethylaniline, p-toluidine, N-methylaniline. Particularly useful catalysts are aromatic N-heterocyclic bases, such as, pyridines, picolines, lutidines, pyrimidines, pyridazines, pyrazines, imidazoles and quinolines. Preferred catalysts are the pyridines including pyridine and pyridine substituted with, for example, hydroxy, amino, halo, lower alkoxy and lower alkyl.

As the reaction media, any inert organic liquid that is a solvent for the reactants may be employed. Suitable organic solvents include acetonitrile, methyl ethyl ketone, hexane, 1,4-dioxane, tetrahydrofuran, benzene, toluene, xylene, cyclohexane, methylene chloride, t-butanol, dimethoxyethane, dimethylsulfoxide and N,N-dimethylformamide.

For achieving practical reaction times, the reaction is conducted at elevated temperatures. However, to prevent decarboxylation of the naphthol reactant, the temperature should not exceed about 85°C., and usually, the reaction temperature ranges between about 60° and 85°C.

Because of the moisture sensitivity of the naphthalide intermediates, the condensation should be conducted under substantially anhydrous conditions, and though not essential, the reaction is preferably conducted under an inert atmosphere, for example, nitrogen.

The dye precursor tube obtained may be hydrolyzed, for example, by treating with an alkaline hydroxide in aqueous or aqueous-organic solution to convert the 3'-carboalkoxy to a 3'-carboxy group to yield the desired indicator dye product. The alkaline hydroxide may be an alkaline earth hydroxide, such as calcium or barium hydroxide, or preferably, an alkali metal hydroxide, such as, sodium or potassium hydroxide. Any water-miscible organic liquid may be used to form the aqueous organic solution, for example, alcohols, such as ethanol, methanol, isopropanol, or water miscible ethers, for example, 1,2-dimethoxyethane or tetrahydrofuran.

Though the dye precursor isolated from the reaction solution may be hydrolyzed directly to the corresponding indicator dye product, it may be purified, for example, by crystallization of the crude material in an appropriate solvent prior to the hydrolysis step. Suitable solvents include alcohols, such as, isopropanol; combinations of alcohols with chlorinated hydrocarbons, such as, isopropanol and methylene chloride mixture; or with ketones, such as, methanol and acetone mixture; and combinations of nitriles with ethers, esters, ketones or hydrocarbons, such as, mixtures of acetonitrile with dimethoxyethane, n-butyl formate, methyl ethyl ketone or benzene.

The 2-carboxy-1-naphthols employed in the subject method may be represented by the formula:

(II)

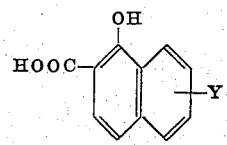

wherein Y has the same meaning given in formula I above.

Among the naphthols which are particularly useful in the production of indicator dyes that are relatively or substantially immobile in a given solution are the alkoxysubstituted 2-carboxy-1-naphthols which form the subject matter of copending U.S. Patent application Ser. No. 174,171 of Richard B. Greenwald filed Aug. 19, 1971. These naphthols may be synthesized by treating a 1,6- or 1,7-naphthalenediol with an acetylating agent in the presence of a Lewis acid catalyst to yield the corresponding 2-acetyl compound followed by oxidizing the 2-acetyl to a 2-carboxy group and reacting the 2-carboxy compound with an alkyl halide to yield the 2-carboxy-6-(or 7-) alkoxy-1-naphthol. These naphthols also may be prepared by treating a 1,6- or 1,7-naphthalenediol in solution in an aprotic solvent with carbon dioxide in the presence of a strong base to form the corresponding 2-carboxy compound which is then reacted with an alkyl halide to yield the alkoxy-substituted 2-carboxy-1-naphthol.

The naphthalide intermediates employed in the subject method may be represented by the formula:

(III)

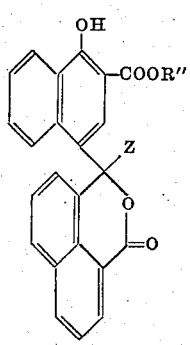

wherein R'' is lower alkyl, e.g., ethyl, propyl, isopropyl, n-butyl, t-butyl and preferably, methyl and Z is a leaving group. Typical leaving groups are halo, -OR wherein R is a monovalent hydrocarbon radical or a monovalent substituted hydrocarbon radical and -OCOR' wherein R' is a monovalent hydrocarbon radical or a monovalent substituted hydrocarbon radical.

The halo intermediates may be prepared by halogenation of a 3-hydroxy-3-(3'-lower carboalkoxy-4-hydroxy-1'-naphthyl)naphthalide to the corresponding 3-halo naphthalide, preferably, 3-chloro or 3-bromo. This may be accomplished by treating the 3-hydroxy naphthalide with phosphorus pentachloride, thionyl chloride, phosphorus pentachloride, N-chlorosuccinimide, phosphorus oxychloride, sulfuryl chloride, phosphorus tribormide, N-bromosuccinimide, aluminum bromide, aluminum chloride, boron tribromide, N-bromocaprolactam, cupric bromide or other conventional chlorination or bromination reagent.

The monoether intermediates, 3-OR, may be synthesized by reacting a 3-halo naphthalide, for example, a 3-chloro-3-(3-'-lower carboalkoxy-4'-hydroxy-1'-naphthyl) naphthalide and a mono- or polyhydric aromatic or aliphatic alcohol, saturated or unsaturated, branched or straight chain, such as, benzyl alcohol, β-phenylethyl alcohol, γ-phenyl-n-propyl alcohol, cinnamyl alcohol, methanol, ethanol, isopropanol, sec-butanol, tert-butanol, 1-octanol, 1,2-ethanediol, 1,3-propanediol, 1,4-butanediol, 1,2,3-propanetriol, ethenol, 2-propene-1-ol, 3-butene-1-ol; or by reacting a 3-halo naphthalide and a phenolic compound, such as, α-naphthol, β-naphthol, 1,6-naphthalenediol, 1,7-naphthalenediol, phenol, catechol, resorcinol, hydroquinone, pyrogallol and phloroglucinol. The alcohol or phenolic compound may be unsubstituted or substituted with one or more groups, e.g., halo, cyano, carboxy, nitro, acetyl, lower alkyl and lower alkoxy. The monoether intermediates derived from aliphatic or aromatic alcohols also may be prepared by reacting the alcohol with a 3-hydroxy-3-(3'-lower carboalkoxy-4'-hydroxy-1'-naphthyl)naphthalide. Monoether intermediates of phenols also may be prepared by reacting a 3-(3'-lower carboalkoxy-4'-hydroxy-1'-naphthyl)-naphthalide with a quinone, such as, o- or p-chloranil or 2,3-dichloro-5,6-dicyano-1,4-benzoquinone. In a particularly preferred embodiment, the monoether intermediate is a 3-OR-3-(3'-lower carboalkoxy-4'-hydroxy- 1'-naphthyl)naphthalide wherein R is a phenyl group, unsubstituted or substituted with one or more of the substitutents enumerated above.

The monoester intermediates,

may be prepared by reacting a 3-hydroxy-3-(3'-lower carboalkoxy-4'-hydroxy-1'-naphthyl)naphthalide and an acid anhydride of an organic carboxylic acid having a pKa between about 2.5 and 5.0 in an inert organic solvent in the absence of a base or a strong acid according to the method of copending U. S. Patent application Ser. No. 314,098 of Yunn H. Chiang filed Dec. 11, 1972 and/or by reacting a 3-(3'-lower carboalkoxy-4'-oxo-1'-naphthylidene)naphthalide and an organic carboxylic acid according to the method of copending U. S. Patent application Ser. No. 314,095 of Michael H. Feingold also filed Dec. 11, 1972. The 3-OCOR' of the monoester intermediate may be derived from an organic di- or monocarboxylic acid, aromatic or aliphatic including branched or straight chain saturated or unsaturated aliphatic acids, such as, benzoic acid, phthalic acid, isophthalic acid, cinnamic acid, α-naphthoic acid, β-naphthoic acid, acetic acid, butyric acid, caproic acid, capric acid, malonic acid, glutaric acid, sebacic acid, acrylic acid, crotonic acid, vinylacetic acid, methacrylic acid, maleic acid, fumaric acid, muconic acid and so forth. The acid may be unsubstituted or substituted with, for example, amino, hydroxy, halo mercapto, nitro, cyano, lower alkyl, lower alkoxy, acetyl, phenyl, phenyl substituted with methoxy, nitro, halo or cyano, phenoxy and phenoxy substituted with nitro, halo or cyano. Particularly useful because of their convenience and economy of manufacture are the monoester intermediates,

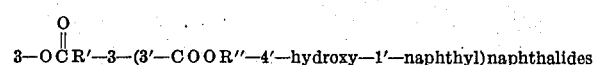

wherein R' is an alkyl group containing 1 to 10 carbon atoms, particularly unsubstituted and monosubstituted alkyl derived from a saturated aliphatic monocarboxylic acid, 'COOH.

The latter intermediates have been found particularly useful in the base-catalyzed reaction with a 2-carboxyl-1-naphthol to form the corresponding dye precursor. Because they exist in substantially complete equilibrium with the corresponding dehydro-naphthalide intermediate and undergo highly reversible side reactions, higher conversions to dye precursor may be achieved with a minimum of by-product formation. The preparation of carboxy-substituted 1-naphthol naphthalides employing monester intermediates for reaction with a 2-carboxy-1-naphthol in the presence of base is claimed in copending U. S. Patent application Ser. No. 314,097 of Yunn H. Chiang and John W. Sparks filed concurrently herewith.

The following examples are given to further illustrate the present invention but are not intended to limit the scope thereof.

EXAMPLE 1

Preparation of the compound of formula (4). The intermediate,

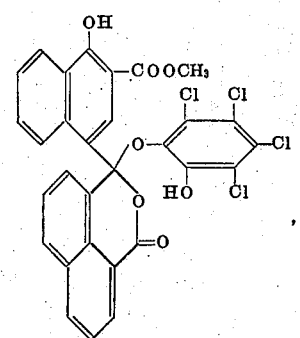

(50 g., 0.08m) and 2-carboxy-6-octadecyloxy-1-naphthol (36.3 g., 0.08 m) were added to a mixture of 680 ml. of tetrahydrofuran, 120 ml. of N,N-dimethylformamide and 0.87 g. of pyridine (0.011m). The mixture was refluxed with stirring on a steam bath for 24 hours. Initially, the intermediate was only partially soluble but after 8 hours, complete solution was attained. Thin layer chromatography (80 benzene 20 methanol on Quanta silica plates) indicated complete absence of the starting intermediate after 24 hours. The reaction mixture was cooled and poured into a mixture of 3.1 of ice and 4 l. of acetic acid with stirring. The white solid was filtered, washed with water and dried at 50°C. in a vacuum oven.

The dried solid was then stirred in 700 ml. of methylene chloride for 30 minutes. The mixture was then filtered through celite and the cake washed with 700 ml. of methylene chloride. The methylene chloride was distilled off at atmospheric pressure until the remaining volume was 300 ml. At this time 250 ml. of isopropanol was added and the distillation continued until the distillate temperature was 78°C. The remaining 250 ml. of solution was allowed to stand overnight at room temperature. Scratching was needed to induce crystallization and after 2 additional hours, the white solid was filtered off and washed with 400 ml. of isopropanol, 400 ml. of methanol and then dried to give 37.5 g. (56.5 percent by weight) of 3-(3'-carboalkoxy-4'-hydroxy-1'-naphthyl)-3-(3''-carboxy-4''-hydroxy-6''-octadecyloxy-1''-naphthyl)naphthalide dye precursor.

The naphthalide dye precursor was hydrolyzed by adding 30.0 g. of precursor to a solution containing 200 ml. of water, 20 ml. of isopropanol and 20 mls. of 50 percent by weight aqueous sodium hydroxide and heating the resulting solution at reflux (about 82°C.) for two hours. After cooling to 25°C., the solution was neutralized by slowly adding with stirring to an ice-water mixture containing 600 mls. of water, 66.0 g. of 4N hydrochloric acid, 66.0 g. of glacial acetic acid and 1.4 kg. ice. The white solid obtained was filtered and reslurried with water and then collected by filtration.

The solid comprising crude 3-(3'-carboxy-4'-hydroxy-1'-naphthyl-3-(3''-carboxy-4''-hydroxy-6''-octadecyloxy-1''-naphthyl)naphthalide dye product was added to about 300 mls. of methanol with stirring, and the slurry was heated to reflux at about 2°C. per minute. When a steady reflux was achieved, the slurry was cooled to 25°C., filtered, and the filter cake washed with several 30 ml. portions of methanol until the filtrate was clear. The white solid obtained was then dried at 60°C. full vacuum to a constant weight to give an overall yield of 37 percent by weight of title compound. $\lambda max = 648$, $\epsilon = 37,300$.

The monoether intermediate employed above was prepared as follows:

3-(3'-carbomethoxy-4'-hydroxy-1'-naphthyl) naphthalide (85.5 g.; 0.22 m) and o-chloranil (57.0 g.; 0.23m) were added to 1,200 ml. of toluene. The mixture was stirred at reflux for 3 hours. After cooling to room temperature, the pinkish solid was filtered and washed with 1500 of cold toluene. The solid was dried to give 112.3 g. (81 percent by weight) of analytically pure tetrachlorocatechol-naphthalide adduct.

Rather than o-chloranil, p-chloranil or a 1,4-quinone, such as, 2,3-dichloro-5,6-dicyano-1,4-benzoquinone may be employed in the above procedure to yield particularly preferred monoether intermediates. As noted above, preferred monoether intermediates are those wherein the leaving group, 3-OR, is phenoxy wherein the phenyl portion is substituted or unsubstituted.

EXAMPLE 2

Preparation of the compound of formula (4).
The intermediate, (16.7 g.; 0.04 mole) was slurried in approximately 100 ml. of benzene. Addition of 3.2 g. of pyridine caused immediate formation of a red crystalline substance, 2-carboxy-6-octadecyloxy-1-naphthol (18.2

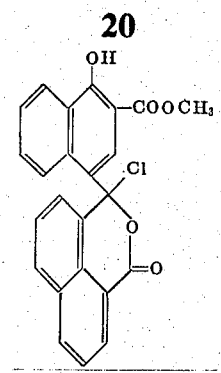

g.; 0.04 mole) was added, and the mixture was heated at reflux (~80°C.) for about 2 hours. The red color disappeared, and a solution was obtained.

The solvent was removed in vacuo at 50°C., and 100 ml. of water, 100 ml. of ethanol and 25 ml. of 50 percent by weight aqueous sodium hydroxide were added. The resulting solution was heated on a steam bath for about 90 minutes, cooled to room temperature and added dropwise to a crushed ice-concentrated hydrochloric acid slurry. The product was filtered and dried in vacuo at 60°C. giving 27.6 g. of the title compound ($\epsilon=13,800$ at 648 nm.).

The 3-chloro-3-(3'-carbomethoxy-4'-hydroxy-1'-naphthyl)naphthalide was prepared as follows:

Dry 1-hydroxy-2-naphthoic acid (50 gms., 0.266 mole) was suspended in 350 ml. dry benzene in a flame-dried 1 liter 1-neck round bottom flask under an air condenser and drying tube. Thionyl chloride (31.7 gms., 0.266 mole) was added in one portion followed by 1.5 ml. dry N,N-dimethyl-formamide. The reaction mixture was stirred magnetically 2–3 days at room temperature. Insoluble material (6.5 gms.) was removed by filtration, and the yellow-tan filtrate was evaporated to dryness to give pale yellow 1-hydroxy-2-naphthoyl chloride, m. p. 87°–88°C. Chilled anhydrous methanol (100 ml.) was added quickly to the solid chloride in an exothermic reaction. The partial solution was heated about 5 minutes on the steam bath under a drying tube then allowed to cool. The suspension was chilled and the solid was collected to give 43. gms. (92 percent by weight) of 1-hydroxy-2-methyl naphthoate.

A mixture of 6.7 g. (0.03315 moles) of 1-hydroxy-2-methylnaphthoate and 6.63 g. (0.03315 moles) of naphthalaldehydic acid in 90 ml. 12 percent p-toluenesulfonic acid in acetic acid was stirred and refluxed overnight. The mixture was then cooled to room temperature. The solid was filtered, washed with acetic acid, then water, and dried. The solid thus obtained was recrystallized from 1,400 ml. acetone and 200 ml. methanol (Norit) to give 11 g. (85 percent by weight) of 3-(3'-carbomethoxy-4'-hydroxy-1'-naphthyl)naphthalide as white hairlike needles.

A mixture of the naphthalide prepared above 600 g. (1.56 moles), and o-chloranil, 400 g. (1.63 moles) in 12,000 ml. dioxane, containing 188 g. (3.12 moles) acetic acid, was stirred and refluxed for 17 hours. At this point, 50 ml. water was added, and stirring and refluxing was continued for an additional 3 hours. The dark solution was then evaporated in vacuo to dryness. The residue was triturated well with ether, and the solid was filtered and washed well with ether, to give 432 g. (69 percent by weight) of 3-hydroxy-3-(3'-carbomethoxy-4'-hydroxy-1'-naphthyl)naphthalide.

The 3-hydroxy-3-(3'-carbomethoxy-4'-hydroxy-1'-naphthyl) naphthalide-1,8 (50 gms. 0.125 mole) was suspended in dry benzene (500 ml.) in a flame-dried 1 liter round bottom flask fitted with a magnetic stirrer and calcium sulfate drying tube. Thionyl chloride (16.4 gms., 0.137 mole) was added in one portion followed by 2.5 ml. of dry N,N-dimethylformamide. The suspension was stirred at room temperature for 1 day. The 3-chloro-3(3'-carbomethoxy-4'-hydroxynaphthyl) naphthalide-1,8 product was collected on a Buchner funnel and washed with a small amount of dry hexane. Residual solvent was removed in a vacuum dessicator.

EXAMPLE 3

Preparation of the compound of formula (4).

the intermediate employed in this example was a monoester, manely, the monoacetate having the following formula:

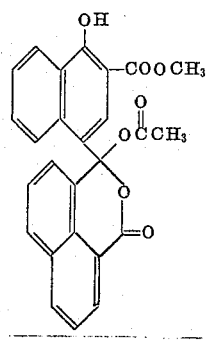

(1) To a 300 ml. 3-neck flask equipped with mechanical stirrer, nitrogen atomsphere and a 20 ml. Dean-Stark trap was added 150 ml. benzene. The benzene was refluxed at least 30 min. to dry the solvent, and the apparatus, the trap removing 25 ml. from the initial solvent volume. After the benzene had cooled to 25°C., 9.12 g. (0.02 mole) of 2-carboxy-6-octadecyloxy-1-naphthol, 10.6 g. (0.024 mole) of the above monoacetate intermediate and pyridine, 0.080 ml. (1.0 m. mole) were added in sequence. The mixture was heated to reflux over a 15 min. interval with rapid stirring and maintained at reflux for 3 hours. At this point, the apparatus was converted to downward distillation, and most of the benzene, originally 125 ml., was stripped at atmospheric pressure. A total of 83 ml. was removed allowing 42 ml. of benzene to remain in the reaction mixture, an easily stirred slurry. (Based on the solid obtained by complete stripping of benzene from the slurry, conversion to dye precursor was 92 percent by weight based on the 2-carboxy-1-naphthol and purity was 85 percent by weight).

(2) Acetonitrile, 100 ml., was added causing nearly total precipitation of product and the solvent mixture was distilled without fractionation. After 100 ml. was collected, b.p. ~ 75°–79°C., a second 100 ml. portion of acetonitrile was added and another 100 ml. of solvent was collected (b.p. 79°–81°C.). An index of refraction check of the distillate (boiling at 81°C.) revealed pure acetonitrile, confirming the almost complete removal of the benzene. The reaction slurry, containing 42 ml. acetonitrile as solvent, was treated with 96 ml. butyl formate and brought to reflux to complete solution. A final portion, 22 ml., of acetonitrile was carefully added to bring the solvent combination to 60:40 butyl formate: acetonitrile. The solution was cooled to 50° C. in 30 minutes and to 25°C. during the next hour. Crystals started appearing above 60°C. The mixture was stirred at 25°C. for 10–18 hours. The granular solid was filtered and twice reslurried for 20 min. in fresh 100 ml. portions of acetonitrile. After drying in vacuo at 60°C., the product comprising dye precursor weighed 13.76 g.(82 percent by weight) and was analyzed as 97+ percent pure by visible absorption in ethanolic sodium hydroxide.

(3) A solution of 6.71 g. (8 m moles) of dye precursor obtained above in 56 ml. isopropanol was prepared by heating the mixture to reflux. A solution of 7.68 g. of 50 percent aqueous sodium hydroxide (96 m. moles) in 88 ml water was added over 5 minutes and the resulting solution was refluxed under nitrogen for 2 hours. After the heat was removed, acetic acid, 6.4 ml. (104 m. moles) was added over one minute and the clear yellow solution was cooled and filtered (from potential solid contaminants). Dropwise addition over 25 minutes to a stirring mixture of 500 ml. ice water, 150 ml. acetic acid and 20 ml. concentrated hydrochloric acid produced a white solid which was filtered, washed with water, and vacuum dried at 60°C. The off-white solid comprising dye product weighed 6.58 g. and had a visible absorption $\epsilon$ (648 nm.) = 36.1 × $10^3$, indicating 97 percent purity. The overall yield of dye at this stage was 82 percent by weight based on the carboxy-naphthol starting material.

(4) Exactly 6.00 g. of powdered 97 percent pure dye product and 60 ml. methanol were heated under nitrogen to reflux, over 15 minutes, with rapid stirring, and held at reflux for 30 minutes.

ulc slurry was allowed to air cool with stirring and kept at 25°C. for 1 ½ hours. Addition of 20 ml. methanol and stirring for two minutes thinned the thick slurry. The white solid was filtered, washed with 35 ml. methanol and vacuum dried at 60°C. The yield of final dye having a visible absorption $\epsilon$ (648 nm.) = 37.1 × $10^3$ (Standard = 37.1 × $10^3$), was 5.57 g. (93 percent by weight). This represents an overall yield of title compound of 76 percent by weight based on 2-carboxy-6-octadecyloxy-1-naphthol.

In the above procedure, the dye precursor formed in step 1 may be isolated by complete removal of the benzene and hydrolyzed directly without purification. To facilitate final purification of the dye product, however, the dye precursor usually is purified prior to the hydrolysis step by crystallization from an appropriate solvent, for example, methyl ethyl ketone or dimethoxyethane combined with acetonitrile. Alcohols such as isopropanol or 2-butanol may also be used. Particularly preferred as the crystallization solvent is 60:40 butyl formate: acetonitrile, since this system gives high recovery (80–82 percent) of highly pure precursor (96+ percent) in a single crystallization.

Step 1 was repeated using a 1:1 molar ratio of monoacetate intermediate and 2-carboxy-6-octadecyloxy-1-naphthol and 0.1 equivalent of different bases as catlysts. The catalysts employed, their pKa and the percent by weight conversion to dye precursor obtained with each are shown in the following table.

| Catalyst | pKa | % Conversion |
|---|---|---|
| none | — | 10 |
| 3-chloropyridine | 2.84 | 72 |
| 2-aminopyrimidine | 3.45 | 64 |
| p-toluidine | 5.08 | 32 |
| pyridine | 5.25 | 83 |
| α-picoline | 5.97 | 79 |
| 2,6-lutidine | 6.7 | 73 |
| n-butylamine | 10.77 | 64 |
| triethylamine | 11.01 | 65 |
| di-n-butylamine | 11.25 | 65 |
| lithium hydride | >14. | 57 |

Step 1 also was repeated using different solvents. The substitution of acetonitrile, t-butanol, dimethoxyethane and a mixture of acetonitrile-tetrahydrofuran for benzene gave percent by weight conversions to dye precursor or about 80 percent, 70 percent, 80 percent and 80 percent, respectively.

The 3-acetoxy-3-(3'-carbomethoxy-4'-hydroxy-1'-naphthyl)naphthalide employed above was prepared as follows:

A mixture of 40.0 g. (0.1 mole) of 3-hydroxy-3-(3'-carbomethoxy-4'-hydroxy-1-naphthyl)naphthalide-1,8, 40 ml. of acetic anhydride (0.43 mole) and 60 ml. of glacial acetic acid was refluxed for about 2hours with moderate stirring under nitrogen atmosphere. A white solid precipitated out of the red homogeneous solution after approximately 12 minutes. The reaction mixture was diluted with 200 ml. of a 35 percent solution of hexane in toluene (volume percent). After cooling the hexane-toluene suspension to room temperature, an additional 150 ml. of 35 percent hexane in toluene was added. The reaction mixture was cooled in a refrigerator (0° to 5°C.) overnight, filtered, washed with three 100 ml. portions of 35 percent solution of hexane in toluene and dried to give 42.70 (97 percent by weight yield), of the 3-acetoxy-naphthalide as a snowwhite solid, melting range 218°-22°C. (dec.).

The preparation of 3-hydroxy-3-(3'-carbomethoxy-4'-hydroxy-1'-naphthyl)naphthalide has been described above. The 3-hydroxy-3-(3'-lower carboalkoxy-4'-hydroxy-1'-naphthyl) naphthalides also may be synthesized by forming a complex of a 1-hydroxy-2-alkyl naphthoate (2-carboxy-1-naphthol) by reacting the naphthoate with anhydrous aluminum chloride followed by the addition of solvent, such as, nitrobenzene. Naphthalyl dichloride (3,3-dichloronaphthalide) is then added to the solution containing the naphthoate as an activated complex to form the 3-hydroxy-(3'-lower carboalkoxy-4'-hydroxy-1'-naphthyl)naphthalide The 1-hydroxy-6-octadecyloxy-2-naphthoic acid employed in the above Examples was prepared by adding sodium methoxide (67.4 gms., 1,35 mole) to a solution of 1,6-dihydroxy-naphthalene (100 gms., 0.625 mole) in 900 ml. of dry N,N-dimethyl-formamide saturated with dry carbon dioxide gas. A steady flow of carbon dioxide was maintained throughout the reaction. Approximately 125 ml. of dimethylformamide was distilled and the mixture was then refluxed for 15 minutes and an additional 125 ml. of solvent removed. The solution was cooled and the flow of carbon dioxide stopped. The reaction mixture was acidified with concentrated hydrochloric acid and then poured onto about 2,000 gms. of ice. The precipitated dark solid was filtered and dried and then triturated with 1 liter of boiling benzene and filtered free of dark impurities. Recrystallization from water gave 1,6-dihydroxy-2-naphthoic acid as a white solid (melting range 220°-221°C.).

To a well-stirred slurry of 1,6-dihydroxy-2-naphthoic acid (5.1 gms., 0.025 mole) in 50 ml. of dry isopropyl alcohol under nitrogen was added potassium t-butoxide (5.65 gms., 0.050 mole). The mixture was heated to reflux and stirred 10–15 minutes and then octadecyl bromide (8.35 gms., 0.025 mole) was added. The reaction was refluxed for 5 hours, cooled and acidified with 20 percent hydrochloric acid. The solid which precipitated was filtered and dried and recrystallized from absolute ethanol to give 3.8 gms. of grey solid. Further recrystallization from chloroform gave 2.3 gms. of 1-hydroxy-6-octadecyloxy-2-naphthoic acid as a white solid (melting range 164°-165°C.).

As noted above, the indicator dyes produced in accordance with the present invention are useful as optical filter agents in photographic processes, and because of their relatively high pKa, are particularly useful in diffusion transfer processes employing highly alkaline processing solutions. Their use as optical filter agents in photographic processes is disclosed and claimed in copending U. S. patent application Ser. No. 103,392 of Myron S. Simon and David P. Waller, filed Jan. 4, 1971, now U.S. Pat. No. 3,702,245. Certain 1-naphthol naphthalides including carboxy-substituted 1-naphthol naphthalides form the subject matter of copending U. S. patent application Ser. No. 103,865 of Myron S. Simon also filed Jan. 4, 1971.

Since certain changes may be made in the above process without departing from the scope of the invention herein involved, it is intended that all matter contained in the above description shall be interpreted as illustrative and not in a limiting sense.

What is claimed is:

1. A method of preparing 1-naphthol naphthalide indicator dyes which comprises:
   A. reacting (a) about 1.0 to 1.5 moles of a 3-Z-3(3'lower carboalkoxy-4'-hydroxy-1'-naphthyl)-naphthalide wherein Z is a leaving group and (b) about 1.0 mole of a 2-carboxy-1-naphthol, in an inert organic solvent at a temperature not exceeding about 85°C. in the presence of about 0.1 and 2.0 moles of a non-water producing base having a pKa of not less than about 2 to form the corresponding 3-(3'-lower carboalkoxy-4'-hydroxy-1'-naphthyl)-3-(3"-carboxy-4"-hydroxy-1"-naphthyl) naphthalide dye precursor and
   B. hydrolyzing said dye precursor to form the corresponding 3-(3'-carboxy-4'-hydroxy-1'-naphthyl)-3-(3"-carboxy-4"-hydroxy-1"-naphthyl)naphthalide dye product.

2. A method as defined in claim 1 wherein said naphthalide (a) is a 3-OR-3-(3'-lower carboalkoxy-4'-hydroxy-1'-naphthyl)naphthalide wherein R is a monovalent hydrocarbon radical or a monovalent substituted hydrocarbon radical.

3. A method as defined in claim 1 wherein said naphthalide (a) is a 3-halo-3-(3'-lower carboalkoxy-4'-hydroxy-1'-naphthyl)naphthalide.

4. A method as defined in claim 1 wherein said base is pyridine.

5. A method as defined in claim 1 wherein said naphthol (b) is 2-carboxy-6-octadecyloxy-1-naphthol.

6. A method as defined in claim 5 wherein said naphthalide (a) is a 3-OR-3-(3'-lower carboalkoxy-4'-hydroxy-1'-naphthyl)naphthalide wherein R is a phenyl group.

7. A method as defined in claim 6 wherein said naphthalide (b) is 3-OR-3-(3'-carbomethoxy-4'-hydroxy-1'-naphthyl)naphthalide wherein R is o-hydroxytetrachlorophenyl.

8. A method as defined in claim 5 wherein said naphthalide (b) is a 3-chloro-3-(3'-lower carboalkoxy-4'-hydroxy-1'-naphthyl)naphthalide.

9. A method as defined in claim 8 wherein said naphthalide (b) is 3-chloro-3-(3'-carbomethoxy-4'-hydroxy-1'-naphthyl)naphthalide.

* * * * *